United States Patent [19]

Knight

[11] Patent Number: 4,546,144
[45] Date of Patent: Oct. 8, 1985

[54] COATING COMPOSITIONS OF TETRAFLUOROETHYLENE AQUEOUS DISPERSIONS

[75] Inventor: Alan C. Knight, Parkersburg, W. Va.

[73] Assignee: E. I. Du Pont De Nemours and Company, Wilmington, Del.

[21] Appl. No.: 569,571

[22] Filed: Jan. 9, 1984

[51] Int. Cl.$^4$ .............................................. C08L 27/12
[52] U.S. Cl. .................................. 524/546; 524/432; 524/436; 524/437
[58] Field of Search ................ 524/546, 437, 436, 432

[56] References Cited

U.S. PATENT DOCUMENTS

| | | | |
|---|---|---|---|
| 2,717,220 | 9/1955 | Fay | 117/126 |
| 3,830,770 | 8/1974 | Ribbans | 260/29.6 |
| 4,169,087 | 9/1979 | Richter | 260/29.6 |
| 4,391,930 | 7/1983 | Olsen | 523/219 |

*Primary Examiner*—Paul Lieberman
*Assistant Examiner*—Amelia B. Yarbrough

[57] ABSTRACT

It has been discovered that if a selected water-soluble aluminum, magnesium or zinc salt of a monovalent anion is added to an aqueous dispersion of a non-melt-fabricable tetrafluoroethylene polymer wherein the dispersion has a pH of 4 or less, the resulting dispersion will flow well on a woven fabric substrate, such as a woven glass fiber fabric, and will fill and cover the interstices of the weave without the necessity of having filler particles present.

3 Claims, No Drawings

COATING COMPOSITIONS OF TETRAFLUOROETHYLENE AQUEOUS DISPERSIONS

FIELD OF THE INVENTION

This invention relates to aqueous dispersions of tetrafluoroethylene polymer useful as coating compositions.

BACKGROUND OF THE INVENTION

Tetrafluoroethylene polymer aqueous dispersions have been used to coat substrates such as fabrics to provide a protective coating. Frequently, such dispersions contain filler materials to enhance the covering power (i.e., to aid in providing a continuous protective coating free of pinholes and the like. In the past a number of patents have dealt with the problem of maintaining the filler in dispersed form during periods of storage of the dispersions before use as coatings. Thus, Fay, U.S. Pat. No. 2,717,220, employs a nonionic surfactant in order to maintain filler (cryolite) in suspension in polytetrafluoroethylene dispersions. Ribbons, U.S. Pat. No. 3,830,770, employs certain water soluble electrolytes, e.g. $Ba(NO_3)_2$, having ionic strengths of between 0.01 and 0.3 moles per kg to aid in maintaining glass beads in suspension. Richter, U.S. Pat. No. 4,169,087, describes that selected sodium phosphates will increase the viscosity of tetrafluoroethylene aqueous dispersion. Olsen, U.S. Pat. No. 4,391,930 teaches that good shelf life can be obtained in certain tetrafluoroethylene aqueous dispersions by using certain glass bubbles as the filler.

It would be desirable to enhance the flowability of tetrafluoroethylene aqueous dispersions onto fabric substrates and to improve the coverage uniformity of the dispersion on the substrate to such an extent that presence of filler particles is no longer needed.

SUMMARY OF THE INVENTION

It has now been discovered that if a selected water-soluble aluminum, magnesium or zinc salt of a monovalent anion is added to an aqueous dispersion of a non-melt-fabricable tetrafluoroethylene polymer wherein the dispersion has a pH of 4 or less, the resulting dispersion will flow well on a woven fabric substrate, such as a woven glass fiber fabric, and will fill and cover the interstices of the weave without the necessity of having filler particles present.

More specifically, this invention can be defined as an aqueous dispersion consisting essentially of (a) water (b) non-melt-fabricable tetrafluoroethylene polymer dispersed in the water, present in an amount of between 20 and 70% based on total dispersion weight, (c) 4.0 to 9.0%, based on weight of tetrafluoroethylene polymer, of a nonionic surfactant, (d) 0.2 to 2.0 moles per kg of tetrafluoroethylene polymer, of at least one water-soluble salt in which the cation is selected from $Al^{+++}$, $Mg^{++}$ and $Zn^{++}$ and the anion is a monovalent inorganic anion or an organic carboxylate anion or dianion; and (e) sufficient inorganic acid or carboxyl-containing organic acid to cause the pH of the dispersion to be equal to 4 or less.

The invention also comprises a process for using the dispersion to coat woven fabric, and a composition comprising a coating of the dispersion on woven fabric.

DESCRIPTION OF THE INVENTION

The tetrafluoroethylene polymer employed herein is the non-melt-fabricable class of tetrafluoroethylene polymer, as opposed to the lower melting, melt-fabricable class of tetrafluoroethylene polymer. The difference between these classes of tetrafluoroethylene polymers can be determined by melt viscosity. Non-melt-fabricable polymers have high melt viscosities, e.g., $1 \times 10^9$ poise or more at 380° C.; while melt-fabricable polymers have much lower melt viscosities, e.g., on the order of $1 \times 10^4$ to $1 \times 10^6$. Melt viscosity of the polymer depends in large part upon the amount, if any, of comonomer present. Generally, the more comonomer present, the lower the melt viscosity. Melt viscosity also depends on the molecular weight of the comonomer. Thus non-melt-fabricable tetrafluoroethylene polymers employed herein include polytetrafluoroethylene and copolymers of tetrafluoroethylene and different perfluorinated ethylenically unsaturated monomers present in an amount which does not cause the melt viscosity of the resultant copolymer to be below $1 \times 10^9$ poise at 380° C. One preferred class of ethylenically unsaturated monomers is perfluoro(alkyl vinyl ether) of 3–7 carbon atoms. Generally, the copolymer can contain up to between about 0.1–0.5% by weight of these comonomers before the melt viscosity falls below $1 \times 10^9$ poise. The maximum amount depends upon the molecular weight of the comonomer. For perfluoro(propyl vinyl ether) the upper limit will be about 0.5%, this limit will be lower as the molecular weight of the ether increases. Another preferred class is perfluorinated alpha-olefins of 3–7 carbon atoms. Generally, the copolymer can contain up to between about 0.5–2.5% by weight of these comonomers before the melt viscosity falls below $1 \times 10^9$ poise. Again, the maximum amount depends on the molecular weight of the comonomer. For hexafluoropropylene the upper limit will be about 2.5%. This limit will be lower as the molecular weight of the olefin increases.

The tetrafluoroethylene polymers employed herein are prepared by the aqueous dispersion preparative method, rather than by the suspension polymerization method. In the aqueous dispersion method, a dispersion of the polymer is obtained by polymerization in an aqueous medium containing dispersing agent, such as from 0.2 to 0.8% by weight (based on water) ammonium perfluorocarboxylate containing 7–10 carbon atoms, to form a dispersion of tetrafluoroethylene polymer particles in water. These particles are substantially round and have an average diameter generally within the range of 0.05 to 0.5 micron.

Polymer concentration is not critical, but generally ranges between 20 and 70% by weight based on weight of dispersion (polytetrafluoroethylene plus water plus nonionic surfactant). Preferred tetrafluoroethylene polymer concentration in the dispersion is 45 to 55% based on weight of dispersion.

If the polymer dispersion does not contain a sufficiently high solids content, the dispersion may be concentrated by evaporative, or creaming, techniques in order to place it in a form ready for addition of the other additives described herein.

The nonionic surfactant component of the dispersion is present in the dispersion in order to aid in maintaining the polymer in dispersed form and to aid the electrolyte in providing the beneficial effect of improved storage stability without causing coagulation. If the nonionic surfactant content is increased to 11% or more by weight polymer based on solids, the sintered or fused product obtained from the dispersion may have a distinct brownish color. Thus, in order to minimize discoloration caused by the nonionic surfactant, a concentration below about 10%, and preferably of about 5% by wt. based on solids is desired. Generally from 5 to 8% by weight based on solids of the surfactant will prevent coagulation when the electrolyte is added.

The nonionic surfactant component is any nonionic surfactant which is soluble in water at room temperature (20°–25° C.) at the concentration desired and can be composed of a single nonionic surfactant or a mixture of nonionic surfactants. Typically, the nonionic surfactants are prepared as reaction products of ethylene oxide, which imparts a hydrophilic moiety to the surfactant with other compounds which impart hydrophobic moieties to the surfactant, such as propylene oxide, amines, saturated and unsaturated aliphatic alcohols and aliphatic acids, and alkyl phenols. For purposes of illustration, some of the nonionic surfactants that can be used herein have the formulae:

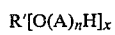

wherein $(A)_n$ is the group $(C_2H_4O)_n$ or a mixture of the groups $(C_2H_4O)_a$ and $(C_3H_6O)_b$, wherein n in each instance is an integer of from 2 to 50 and preferably 2 to 18, b is an integer of 0 to 30, and a is an integer of at least 2, a+b being equal to n, x is an integer of 1,2, or 3; and R' is a hydrocarbon group.

A preferred surfactant has the formula:

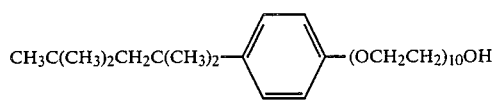

Other useful surfactants are described in U.S. Pat. No. 3,830,770.

The salts that have been found to be effective are water-soluble, i.e., they have a solubility in water at 25° C. of at least 0.15 moles/liter. The salts must also be composed of a monovalent inorganic anion or an organic carboxylate anion or dianion, and a cation that is either $Al+++$, $Mg++$ or $Zn++$. Mixtures of such salts can be employed. Representative anions include both inorganic and organic hydrocarbon carboxyl anions, nitrate, formate, acetate, halide (chloride, etc.), oxalate and the like. Preferred salts include aluminum salts which decompose at high temperatures, i.e., above 280° C., to form an aluminum oxide (which is substantially water insoluble).

The weight of the salts that must be present depends on the cation used. For $Al+++$, the composition may contain 0.2 to 2.0 moles per kg of polymer present. For a dispersion containing 50% polymer this is equivalent to an ionic strength of 1.2 to 12.0 moles per kg of dispersion. For $Zn++$ or $Mg++$ the composition may contain 0.2 to 2.0 moles per kg of polymer present. This is equivalent to an ionic strength for the Zn or Mg of 0.6 to 6.0 moles per kg of dispersion.

It is necessary that the dispersions be strongly acidic, i.e., have a pH of 4 or less. To achieve a pH of 4 or less any acid can be used provided it does not interfere with the flowability of the composition onto fabric. Preferably inorganic mineral acids are used such as nitric or hydrochloric acid. Organic carboxylic acids can also be used, such as formic, acetic, propionic or oxalic, and the like.

The salt and the acid are ordinarily added to an aqueous dispersion of the polymer, either per se or in admixture, or in an aqueous solution of their own depending on convenience and feasibility.

The aqueous dispersion of this invention is useful in coating woven fabrics, especially woven glass fabric. Such fabrics have apertures between the yarn of the fabric. The polymer in the dispersion of the present invention fill up these apertures with coating mateial with fewer recoating steps than if the salt and acid were omitted. The resultant glass fabric with a continuous coating of residue of dispersion of the present invention after drying and sintering of the PTFE is especially useful in architectural applications such as for inflatable roofing. The ingredients in dispersion cause the polymer to flow in these apertures or interstices more easily to provide a smooth, unbroken film or coating using less dispersion on polymer than previously required with art compositions.

Such woven fabrics are coated by any usual coating means for applying a dispersion. Ordinarily the woven fabric is simply dipped into the dispersion or passed through the dispersion and then the fabric wet with dispersion solids is usually passed through or over wiping bars to remove excess liquid and is then dried to leave a continuous coating of tetrafluoroethylene polymer on the woven fabric. If desired, top coatings of various coating materials can then be applied depending on he ultimate end use of the coated fabric.

EXAMPLES AND COMPARISONS

In the examples and comparisons, test results described therein were obtained by the following:

Description of Tests

Dispersion % solids and % "Triton" (based on solids) were determined gravimetrically by weight differences on drying at 100° C. and sintering at 380° C.

Melt viscosities of the tetrafluoroethylene polymers can be determined, if desired, by coagulating the as polymerized aqueous dispersion.

Melt viscosities of the tetrafluoroethylene polymers can be calculated by measuring the tensile creep of a sintered piece held at 380° C. Specifically, 12 g of molding powder is placed in a 7.6 cm diameter mold between 0.152 cm rubber cauls and paper spacers. The mold is then heated at 100° C. for 1 hour. Pressure is then slowly applied on the mold until a value of 140.6 kg/cm² is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm wide, 0.152 to 0.165 cm thick, and at least 6 cm long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar oven where the 4 cm test length is brought to a temperature of 380°±2° C. A weight is then attached to the bottom quartz rod to give a total weight suspended from the sample sliver of about 4 g. The elongation measurements vs. time are obtained and the best average value for the creep rate in the interval between 30 and 60 minutes is measured. The specific melt viscosity, which may be better called apparent melt viscosity, is then calculated from the relationship.

$$\eta_{app} = (WL_{tg})/3(dL_t/dt)A_t$$

where
- $\eta_{app}$ = (apparent) melt viscosity in shear, poises
- W = tensile load on sample, g
- $L_t$ = length of sample (at 380° C.) cms (4.32 cm)
- g = gravitational constant, 980 cm/sec$^2$
- $(dL_t/dt)$ = rate of elongation of sample under load = slope of elongation vs. time plot, cm/sec
- $A_t$ = cross-sectional area of sample (at 380° C.), cm$^2$ (area increases 37% at 380° C. over that at room temperature).

Viscosities of aqueous dispersions described herein are measured using a Brookfield viscometer (model LVT) operating at 60 r.p.m. at 25° C. using a #2 spindle. The spindle is lowered into the dispersion, and the viscometer is turned on and allowed to equilibrate for one minute before a reading is taken. Readings were taken in triplicate and averaged. The averaged value was multiplied by 5 to obtain the viscosity in centipoise (cps).

Rate of gas flow through fabric was measured as follows: A 6"×6" sample of fabric was clamped between two glass flanges with O-rings to preven leakage. A silicone stopcock grease was applied liberally to the O-rings. The O-rings defined a circular region with an area of 100 square centimeters. Nitrogen gas was supplied to one side of the fabric so that the pressure drop across the fabric was equivalent to a column of water 14 centimeters high. The rate of gas flow through the fabric was measured by collecting it over water and measuring the volume at ambient temperature and saturated with water vapor.

Dispersion formulations and coating procedures are described in the Examples and Comparisons.

Coating Procedure

Fabric used for coating was a medium strength, square weave, glass fabric having a nominal yarn count of 24 warp yarns per inch and 19 fill yarns per inch with a weight of 14.5 oz/sq yd. The openings, i.e. interstices or windows, outlined by two adjacent fill yarns and two adjacent warp yarns in this fabric had average dimensions of 1.5×4.0 mm, although the size varied from essentially no opening up to openings of slightly over 4×4 mm. Desirably a coating will fill these openings in order to prevent passage of air and water through the fabric.

The fabric was cut so as to provide a strip eight inches wide and ten feet long. This strip was mounted between leaders so that it could be pulled lengthwise through a series of treatment steps. After one series of treatment steps, performed as an integrated series and referred to hereafter as a coating pass, the fabric was removed and remounted so that it could be passed again through the equipment for the same or a different process sequence, another coating pass. In each coating pass, the fabric passes down into a liquid coating agent, around a roller under the surface of the liquid, and up past a series of wiping bars placed to remove excess liquid from the surface. Next the fabric passes into a closed vertical channel where it meets a countercurrent flow of heated air. In the first or drying section, the temperature measured by thermocouples close to the fabric path increases from 120° C. to 160° C. The fabric then moves into two oven sections where it is exposed to electric heaters. The temperature measured by thermocouples close to the fabric path is aout 325° C. in the first oven section and 360° C. in the second oven section. The drying section is about 6 ft long and each oven section about 2 ft long. After emerging from the second oven, the fabric goes over the roller and is exposed to ambient air for about 10 feet. It then passes between drive rollers which pull it through the system and is then wound on a take-up roll.

The first coating pass used no liquid in the dip tank. The purpose was to "heat-clean" the fabric by partially burning off the sizing material. For the second pass the liquid used was a 3% aqueous dispersion of silicone oil made by diluting a commercial dispersion. Dow Corning ET-4327. This silicone treatment is commonly used to provide a lubricant on the glass fibers. The first and second passes were made at a linear speed of three feet per minute. For subsequent passes a coating liquid was prepared as described in the Examples and Comparisons.

Comparison A

This experiment provides results of coating tetrafluoroethylene polymer dispersion which does not contain a water soluble salt. Woven glass fiber could not be coated with a continuous coating even though a large amount of coating was applied.

For the subsequent passes the coating liquid was prepared as follows: To ten pounds of an aqueous dispersion of poly(tetrafluoroethylene) having a melt viscosity of over $1 \times 10^9$ poise and containing 60.7 wt % of polymer solids and 5.93% based on solids of "Triton" X-100, a non-ionic surface active agent, was added 997 ml of water. The third pass used the above dispersion and was made at two ft per minute. The fourth and fifth passes used the same dispersion, but were made at three feet per minute.

The total weight of coating applied was measured by cutting samples 6"×6", weighing them, and subtracting the weight of the uncoated glass cloth. Measurement results were as follows:

| Sample | Coating Weight oz/sq yd | Gas Flow ml/min |
|--------|------------------------|------------------|
| 1 | 6.6 | 1125 |
| 2 | 7.2 | 1089 |
| 3 | 6.9 | 1025 |
| 4 | 6.7 | 1343 |

When the fabric was examined under a microscope at about 25× magnification, it could be seen that a typical "window" had a narrow rim of resin around a central opening. This fabric was not sealed at coating weights up to 7.2 oz/sq yd.

EXAMPLE 1

Fabric was coated as described in the Coating Procedure, except that the third, fourth, and fifth coating passes were made using a dispersion prepared as follows. To ten pounds of an aqueous dispersion containing 60.7% poly(tetrafluoroethylene) of melt viscosity over $1 \times 10^9$ poise and 5.93% based on solids of "Triton"

X-100, a non-ionic surface-active agent, were added 972 ml of water, 25 ml of concentrated nitric acid, and 800 g of $Al(NO_3)_3.9H_2O$ (0.774 moles/kg polymer solids). The dispersion pH was 0.61 and the viscosity was 15.0 centipoise. Samples of the coated fabric after the fifth pass gave the following values.

| Sample | Coating Weight oz/sq yd | Gas Flow ml/min |
|---|---|---|
| 1 | 6.4 | No Flow |
| 2 | 5.8 | No Flow |

Comparison B (comparison with Example 2)

Fabric was coated as described in the Coating Procedure, except that there was no fifth pass and the third and fourth passes were made using an aqueous dispersion containing 48.7% polytetrafluoroethylene solids, 1.3% copolymer solids, and 6% based on solids of "Triton" X-100 a non-ionic surface active agent no water-soluble salt was present. The copolymer solids had a composition derived 10.5 weight percent from hexafluoropropylene and 89.5 weight percent from tetrafluoroethylene. Test results were as follows:

| Sample | Coating Weight oz/sq yd | Gas Flow ml/min |
|---|---|---|
| 1 | 6.4 | 1077 |
| 2 | 6.8 | 1031 |
| 3 | 6.9 | 1069 |

It is seen that where no salt was present, fabric was not sealed at an average coating weight of 6.7 oz/sq yd. even though a flowable copolymer was present to aid in this respect.

EXAMPLE 2

Fabric was coated as in Comparison B except that the mixed homopolymer and copolymer dispersion was modified by adding to 10 lb of dispersion 400 g of $Al_2(NO_3)_3 9H_2O$ (0.470 moles/kg polymer solids) and 12.5 ml of concentrated $HNO_3$. The pH of the dispersion was 0.88. The gas flow results were as follows:

| Sample | Coating Weight oz/sq yd | Gas Flow ml/min |
|---|---|---|
| 1 | 6.2 | No Flow |
| 2 | 6.2 | No Flow |
| 3 | 6.0 | No Flow |
| 4 | 6.2 | No Flow |

The fabric was completely sealed at an average coating weight of 6.2 oz/sq yd.

It is seen that compared to Comparison B, Example 2 is superior.

Comparison C (comparison with Example 3)

Fabric was coated as described in the Coating Procedure, except that the third, fourth, and fifth coating passes were made using a dispersion prepared as follows. To ten pounds of an aqueous dispersion containing 60.7% PTFE and 5.93% based on solids of "Triton" X-100, a non-ionic dispersing agent, were added 972 ml of water and 25 ml of concentrated nitric acid. The resulting dispersion pH was 1.38, and the viscosity was 18.0 centipoise.

Samples of the coated fabric after the fifth pass gave the following values.

| Sample | Coating Weight oz/sq yd | Gas Flow ml/min |
|---|---|---|
| 1 | 6.7 | 1173 |
| 2 | 6.9 | 1100 |
| 3 | 6.7 | 1388 |

This experiment shows that low pH alone, without the salt present, will not aid in providing a good continuous coating and that the water-soluble salt is needed.

EXAMPLE 3

Fabric was coated as described in the Coating Procedure, except that the third coating pass was made at 3 ft/min and the third, fourth, and fifth coating passes were made using a dispersion prepared as follows. To ten pounds of an aqueous dispersion containing 60.7% PTFE and 5.93% based on solids of "Triton" X-100, a non-ionic dispersing agent, were added 972 ml of water, 25 ml of concentrated nitric acid and 952 g of $Zn(NO_3)_2 6H_2O$ (1.161 moles/kg polymer solids). The dispersion pH was 0.75, and the viscosity was 13.0 centipoise.

Samples of the coated fabric after the fifth pass gave the following values.

| Sample | Coating Weight oz/sq yd | Gas Flow ml/min |
|---|---|---|
| 1 | 5.8 | No Flow |
| 2 | 5.5 | 551 |
| 3 | 5.5 | 560 |
| 4 | 5.8 | No Flow |

At 5.8 oz/sp yd of coating, the fabric was well-sealed. At 5.5 oz/sq yd, there were some openings which allowed gas to pass.

This Example shows that $Zn(NO_3)_2$ is effective at low loading levels of 5.8 oz/sq yd, but that as the coating is spread thinner it becomes less effective.

EXAMPLE 4

Fabric was coated as described in the Coating Procedure, except that the third coating pass was made at 3 ft/min and the third, fourth, and fifth coating passes were made using a dispersion prepared as follows. To ten pounds of an aqueous dispersion containing 60.7% PTFE having a melt viscosity of $1 \times 10^9$ poise, and 5.93% based on solids of "Triton" X-100, a non-ionic dispersing agent, were added 972 ml of water, 25 ml of concentrated nitric acid, and 820 g of $Mg(NO_3)_2.6H_2O$ (1.160 moles/kg polymer solids). The dispersion pH was 0.71, and the viscosity was 13.5 cps. Samples of the coated fabric after the fifth coating pass gave the following values.

| Sample | Coating Weight oz/sq yd | Gas Flow ml/min |
|---|---|---|
| 1 | 5.7 | No Flow |
| 2 | 5.7 | No Flow |
| 3 | 5.7 | No Flow |
| 4 | 5.5 | No Flow |

This Example demonstrates the effectiveness of $Mg(NO_3)_2$.

EXAMPLE 5

Fabric was coated as described in the Coating Procedure, except that the third, fourth, and fifth coating passes were made using a dispersion prepared as follows. To ten pounds of an aqueous dispersion containing 60.7% PTFE having a melt viscosity of over $1 \times 10^9$ poise, and 5.93% based on solids of "Triton" X-100, a non-ionic dispersing agent, were added 972 ml of water, 25 ml of concentrated nitric acid, and 515 g of $AlCl_3 \cdot 6HO_2$ (0.774 moles/kg polymer solids). This gave a pH of 0.70 and a viscosity of 20 cps. Samples of the coated fabric after the fifth coating pass gave the following values.

| Sample | Coating Weight oz/sq yd | Gas Flow ml/min |
|---|---|---|
| 1 | 5.1 | No Flow |
| 2 | 5.3 | No Flow |
| 3 | 5.3 | No Flow |
| 4 | 5.3 | No Flow |

This Example demonstrates the effectiveness of $AlCl_3$.

EXAMPLE 6

Fabric was coated as described in the Coating Procedure, except that the third, fourth, and fifth passes were made using a dispersion prepared as follows. To ten pounds of aqueous dispersion containing 60.5% poly(tetrafluoroethylene) having a melt viscosity of over $1 \times 10^9$ poise, and 5.50% based on solids of "Triton" X-100, a non-ionic dispersing agent, were added 50 ml of concentrated formic acid, 947 ml of water, and 346 grams of aluminum formate, $Al(HCOOH)_3$ (0.777 moles/kg polymer solids). This gave a pH of 3.37 and a viscosity of 18.5 centipoise. Samples of the coated fabric after the fifth coating pass gave the following values.

| Sample | Coating Weight oz/sq yd | Gas Flow ml/min |
|---|---|---|
| 1 | 7.1 | No Flow |
| 2 | 6.3 | 347 |
| 3 | 5.8 | No Flow |
| 4 | 5.8 | No Flow |
| 5 | 5.8 | No Flow |

This Example demonstrates the effectiveness of aluminum formate. Sample 2 is regarded as an anomoly.

EXAMPLE 7

Fabric was coated as described in the Coating Procedure, except that the third, fourth, and fifth coating passes were made using a dispersion prepared as follows. To ten pounds of aqueous dispersion containing 60.5% poly(tetrafluoroethylene) having a melt viscosity of over $1 \times 10^9$ poise, and 5.50% based on solids of "Triton" X-100, a non-ionic dispersing agent, were added 751 ml of water, 246 ml of glacial acetic acid, and 300 grams of basic aluminum acetate, a practical grade containing boric acid as a stabilizer. Formula given was $Al(OH)_2(OOCCH_3) \cdot \frac{1}{3}H_3BO_3$. This gave a pH of 3.65, indicating an excess of acid and conversion of the salt to the tri-acetate, and a viscosity of 15.5 centipoise.

Samples of the coated fabric after the fifth coating pass gave the following values.

| Sample | Coating Weight oz/sq yd | Gas Flow ml/min |
|---|---|---|
| 1 | 6.6 | No Flow |
| 2 | 6.5 | No Flow |
| 3 | 6.2 | No Flow |
| 4 | 6.2 | No Flow |

This fabric was well sealed at an average coating weight of 6.4 oz/sq yd, and demonstrates the effectiveness of aluminum acetate.

I claim:
1. An aqueous dispersion consisting essentially of
   (a) water
   (b) non-melt-fabricable tetrafluoroethylene polymer dispersed in the water, present in an amount of between 20 and 70% based on total dispersion weight,
   (c) 4.0 to 9.0% based on weight of tetrafluoroethylene polymer, of a nonionic surfactant,
   (d) 0.2 to 2.0 moles per kg of tetrafluoroethylene polymer, of at least one water-soluble salt in which the cation is selected from $Al^{+++}$, $Mg^{++}$ and $Zn^{++}$ and the anion is a monovalent inorganic anion or an organic carboxylate anion or dianion; and
   (e) sufficient inorganic acid or carboxyl-containing organic acid to cause the pH of the dispersion to be equal to 4 or less.
2. The use of the dispersion of claim 1 to coat woven fabric.
3. Glass fabric coated with the dispersion of claim 1.

* * * * *